(12) United States Patent
Jung et al.

(10) Patent No.: US 12,506,209 B2
(45) Date of Patent: Dec. 23, 2025

(54) BATTERY MODULE AND METHOD OF MANUFACTURING THE SAME

(71) Applicant: LG ENERGY SOLUTION, LTD., Seoul (KR)

(72) Inventors: Kitaek Jung, Daejeon (KR); Junkyu Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 704 days.

(21) Appl. No.: 17/771,928

(22) PCT Filed: Aug. 4, 2021

(86) PCT No.: PCT/KR2021/010201
§ 371 (c)(1),
(2) Date: Apr. 26, 2022

(87) PCT Pub. No.: WO2022/045619
PCT Pub. Date: Mar. 3, 2022

(65) Prior Publication Data
US 2022/0376341 A1    Nov. 24, 2022

(30) Foreign Application Priority Data

Aug. 26, 2020    (KR) .................. 10-2020-0107737
Aug. 3, 2021     (KR) .................. 10-2021-0102180

(51) Int. Cl.
*H01M 50/244*    (2021.01)
*H01M 50/211*    (2021.01)
*H01M 50/258*    (2021.01)

(52) U.S. Cl.
CPC ....... *H01M 50/244* (2021.01); *H01M 50/211* (2021.01); *H01M 50/258* (2021.01)

(58) Field of Classification Search
CPC .................. H01M 50/211; H01M 50/258
See application file for complete search history.

(56) References Cited

U.S. PATENT DOCUMENTS

2007/0141459 A1    6/2007    Goto et al.
2012/0247107 A1    10/2012   Balk et al.
(Continued)

FOREIGN PATENT DOCUMENTS

CN    104969399 A    10/2015
CN    205846026 U    12/2016
(Continued)

OTHER PUBLICATIONS

International Search Report (PCT/ISA/210) issued in PCT/KR2021/010201, dated Nov. 11, 2021.
(Continued)

*Primary Examiner* — Olatunji A Godo
(74) *Attorney, Agent, or Firm* — Birch, Stewart, Kolasch & Birch, LLP

(57) ABSTRACT

The battery module includes a battery cell stack in which a plurality of battery cells are stacked, a frame member for housing the battery cell stack and having an opened upper part, and an upper plate for covering the battery cell stack on an upper part of the frame member, wherein the frame member comprises two side surface parts facing each other and a bottom part connecting the two side surface parts, and wherein a projected part projected inward is formed in the side surface part.

17 Claims, 10 Drawing Sheets

(56) References Cited

U.S. PATENT DOCUMENTS

| | | |
|---|---|---|
| 2014/0014420 A1 | 1/2014 | Nakamura et al. |
| 2014/0023906 A1 | 1/2014 | Hashimoto et al. |
| 2017/0025664 A1 | 1/2017 | Lim et al. |
| 2019/0131596 A1 | 5/2019 | Yang et al. |
| 2019/0267591 A1 | 8/2019 | Park et al. |
| 2020/0067155 A1 | 2/2020 | Hwang et al. |
| 2020/0176745 A1 | 6/2020 | Lee |
| 2020/0350523 A1* | 11/2020 | Weinmann ............ H01M 50/211 |
| 2020/0388804 A1 | 12/2020 | Lee et al. |
| 2021/0050568 A1 | 2/2021 | Yang et al. |
| 2021/0226291 A1 | 7/2021 | Kim et al. |
| 2022/0285772 A1* | 9/2022 | Ishitobi ............... H01M 50/244 |

FOREIGN PATENT DOCUMENTS

| | | |
|---|---|---|
| CN | 110114906 A | 8/2019 |
| CN | 110915019 A | 3/2020 |
| CN | 111527622 A | 8/2020 |
| EP | 3 796 462 A1 | 3/2021 |
| EP | 3 823 081 A1 | 5/2021 |
| EP | 4 027 441 A1 | 7/2022 |
| JP | 2006-286357 A | 10/2006 |
| JP | 2008-235144 A | 10/2008 |
| JP | 2014-93240 A | 5/2014 |
| JP | 2017-54865 A | 3/2017 |
| JP | 2017-126536 A | 7/2017 |
| JP | 2019-133778 A | 8/2019 |
| JP | 2020-501320 A | 1/2020 |
| JP | 2020-517080 A | 6/2020 |
| KR | 10-0601536 B1 | 7/2006 |
| KR | 10-2015-0064257 A | 6/2015 |
| KR | 10-2016-0002174 A | 1/2016 |
| KR | 10-2017-0010531 A | 2/2017 |
| KR | 10-2018-0113416 A | 10/2018 |
| KR | 10-2019-0054709 A | 5/2019 |
| KR | 10-2019-0090299 A | 8/2019 |
| KR | 10-2020-0051393 A | 6/2020 |
| KR | 10-2020-0064761 A | 6/2020 |
| KR | 10-2020-0066907 A | 7/2020 |
| KR | 10-2020-0099106 A | 8/2020 |

OTHER PUBLICATIONS

Extended European Search Report for European Application No. 21861916.1, dated Dec. 22, 2022.

* cited by examiner

[FIG. 1]
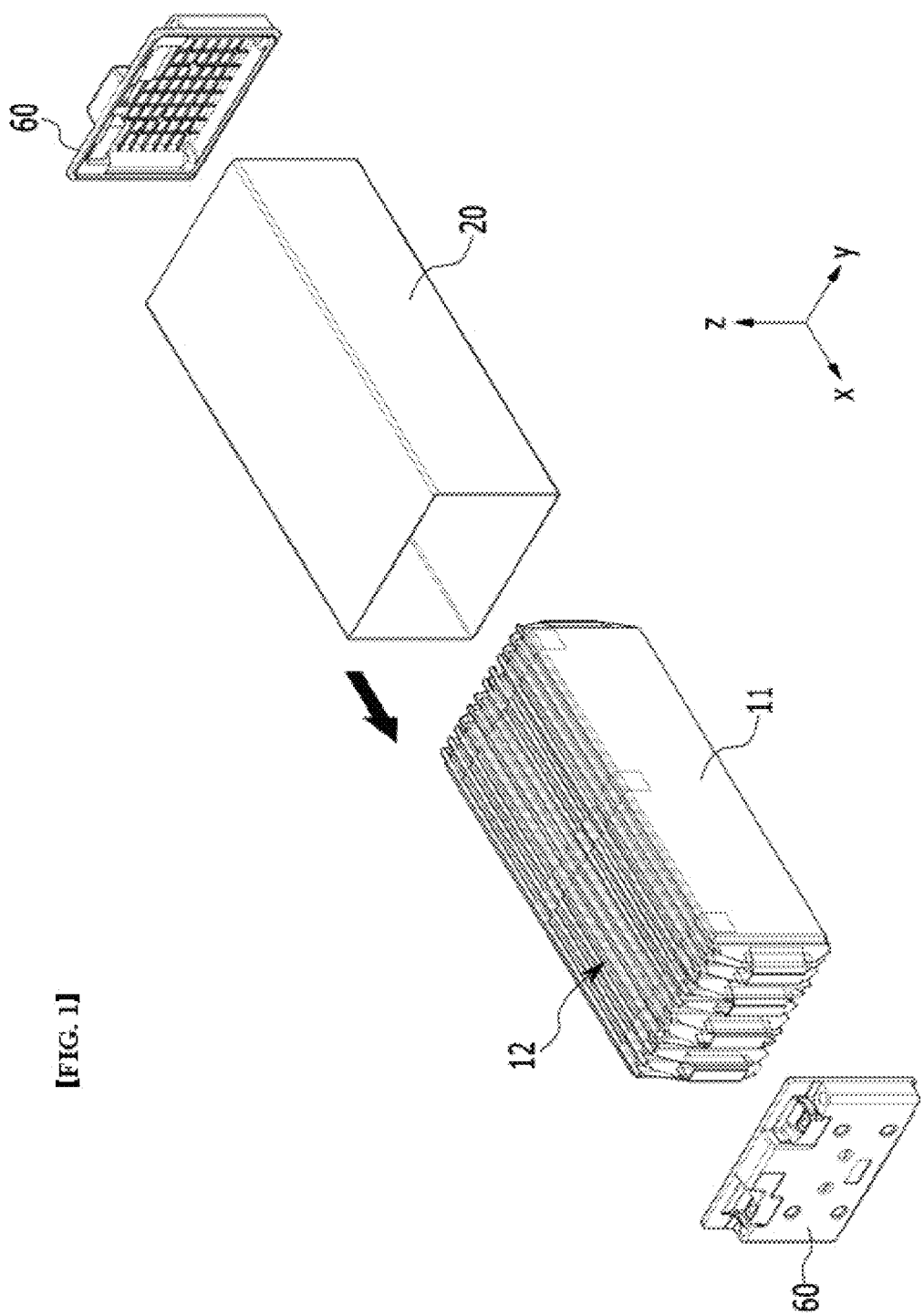
Related Art

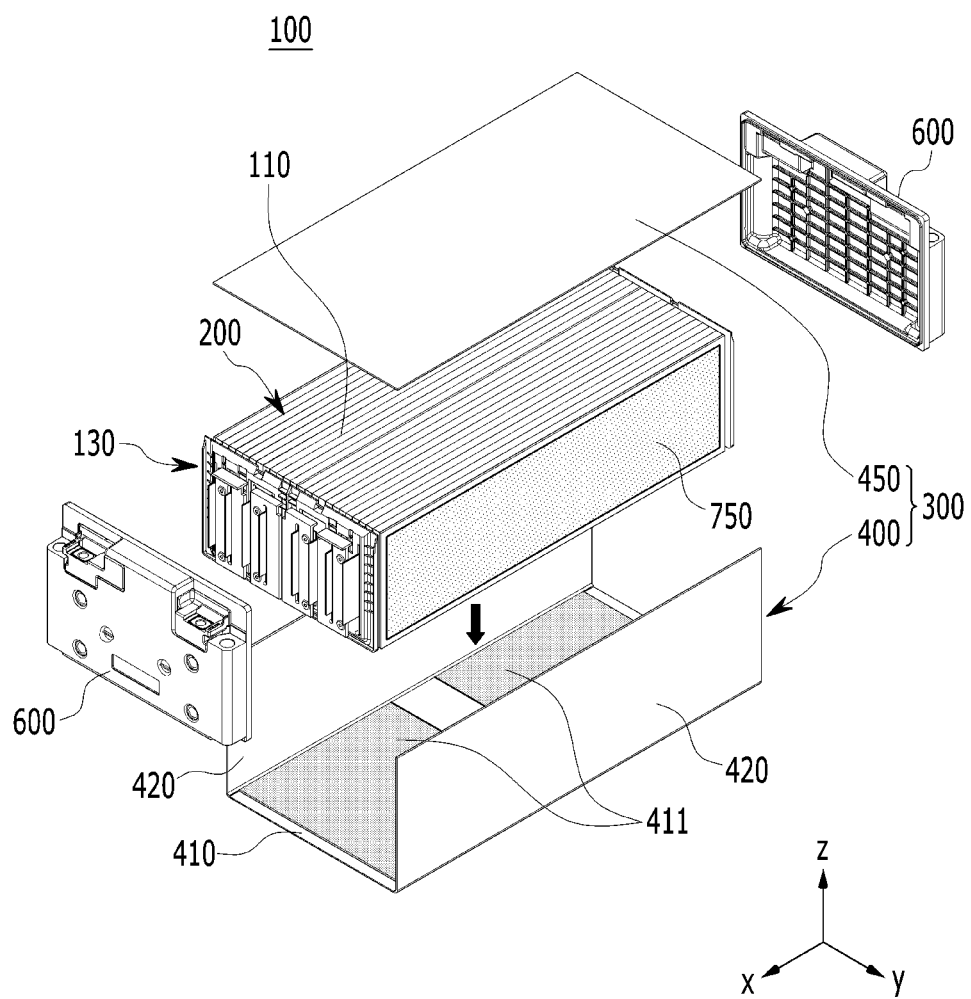
[FIG. 2]

[FIG. 3]
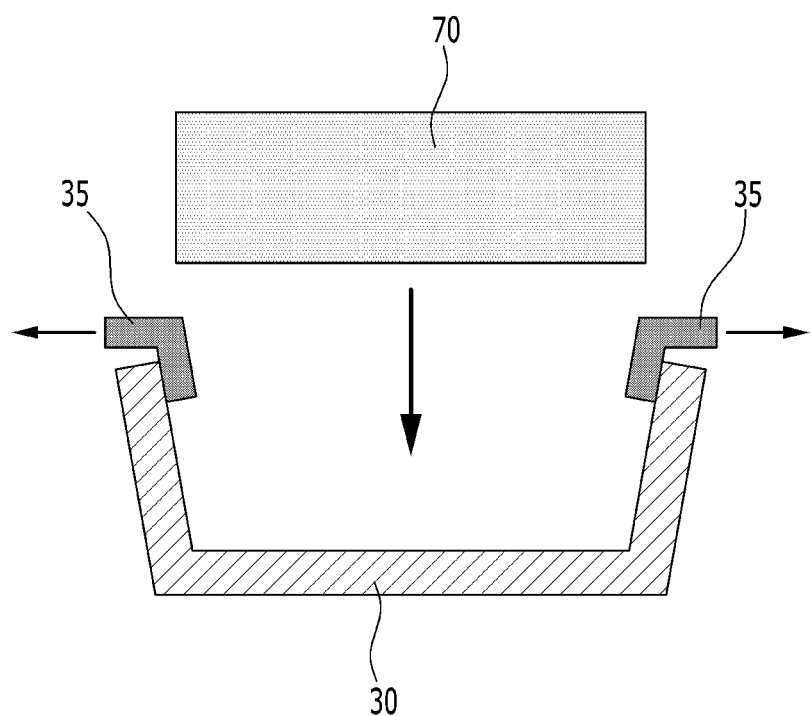

[FIG. 4]
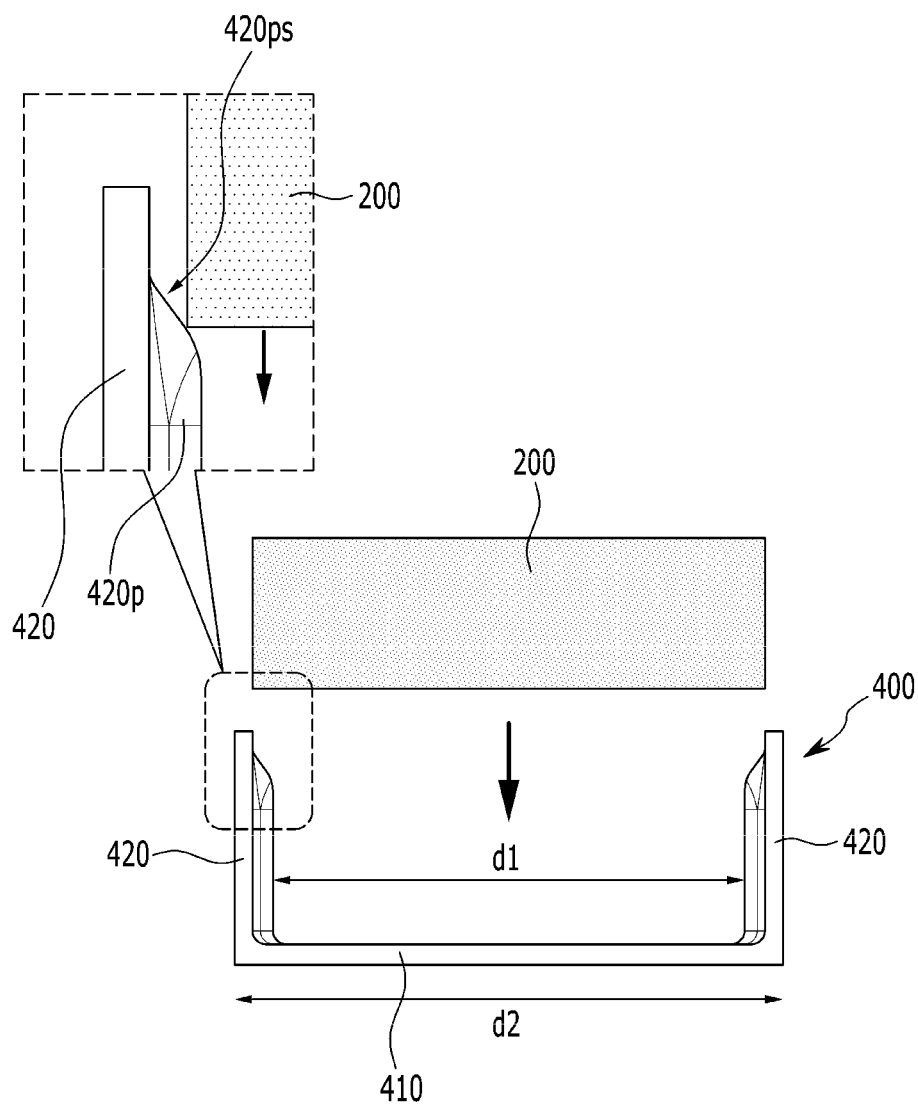

【FIG. 5】
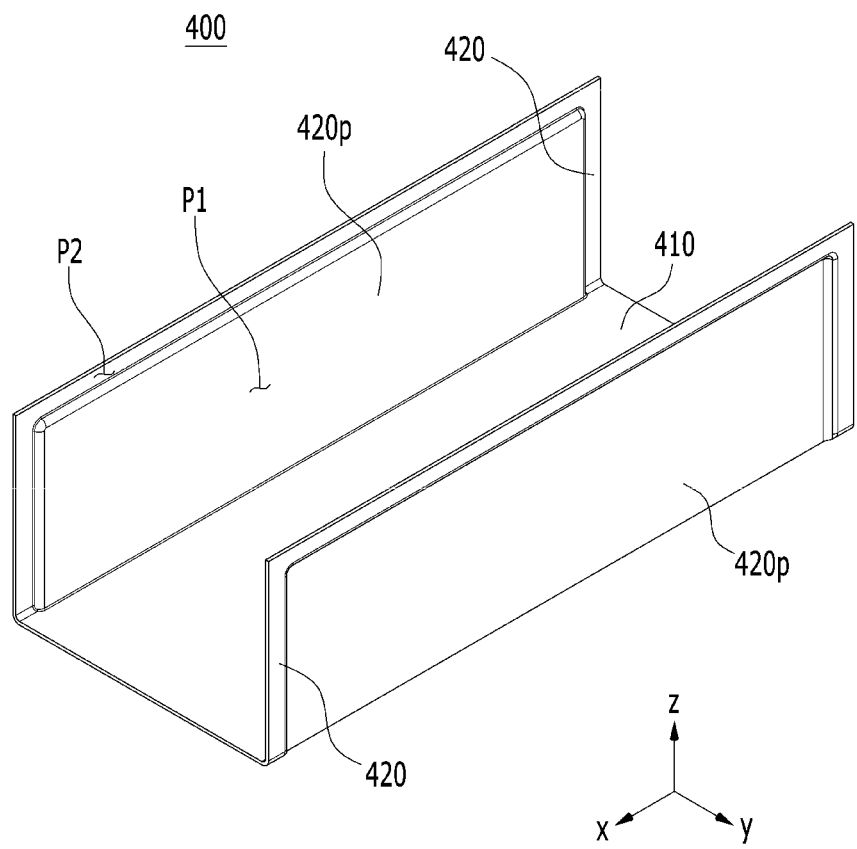

[FIG. 6]
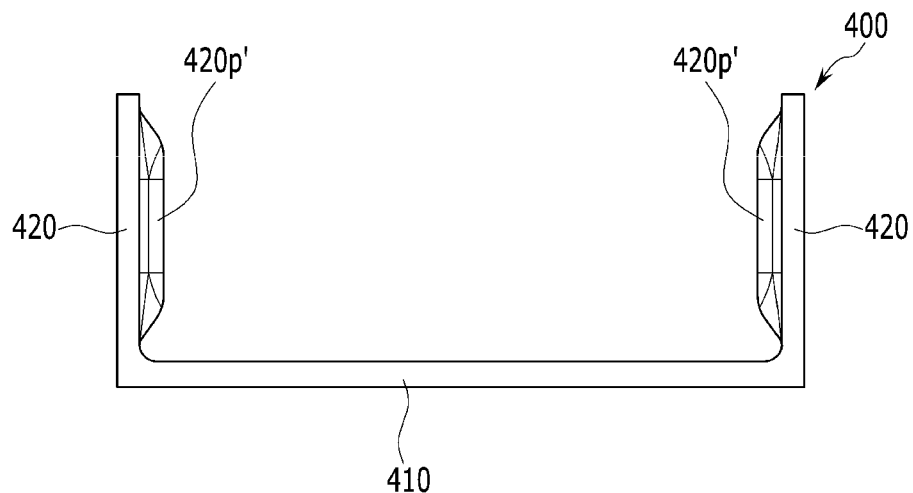
[FIG. 7]
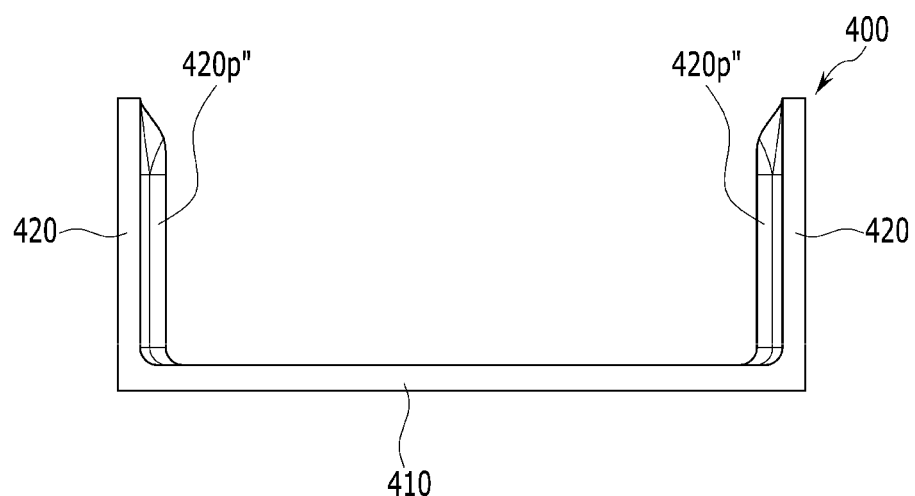

[FIG. 8]
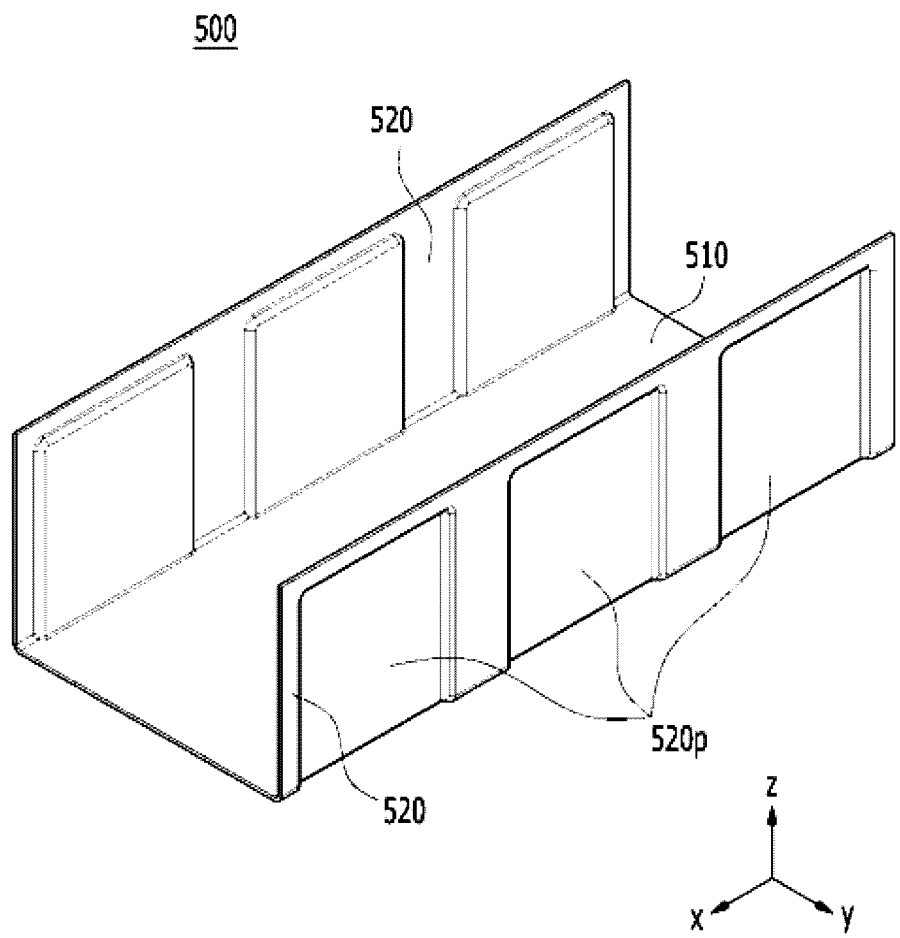

[FIG. 9]
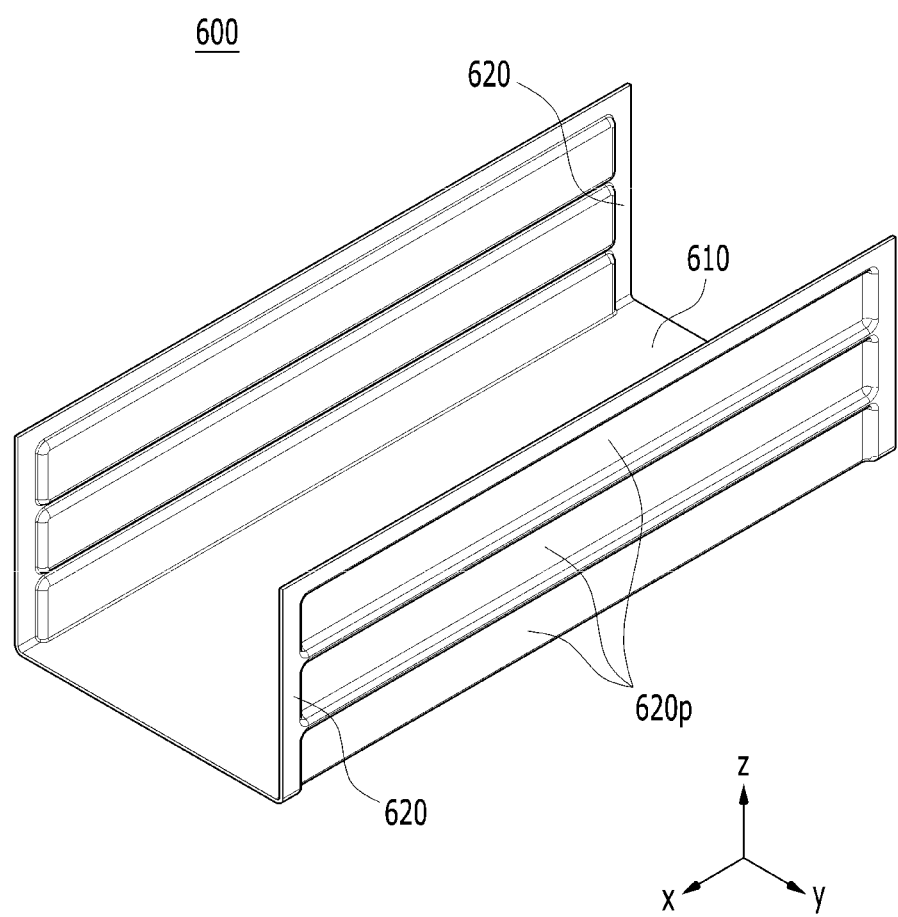

[FIG. 10]
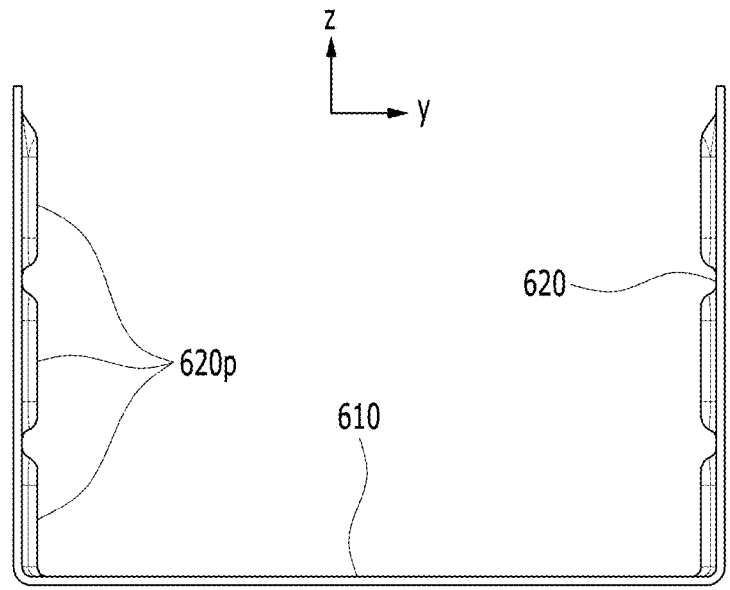
[FIG. 11]
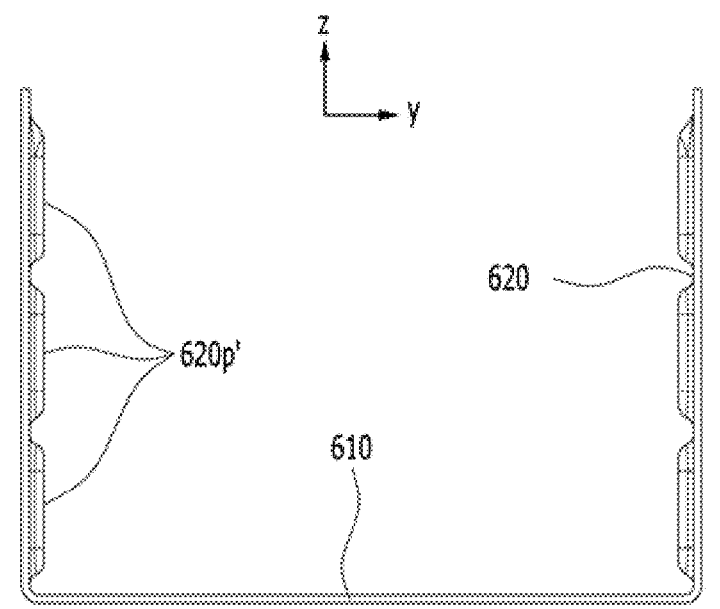

[FIG. 12]
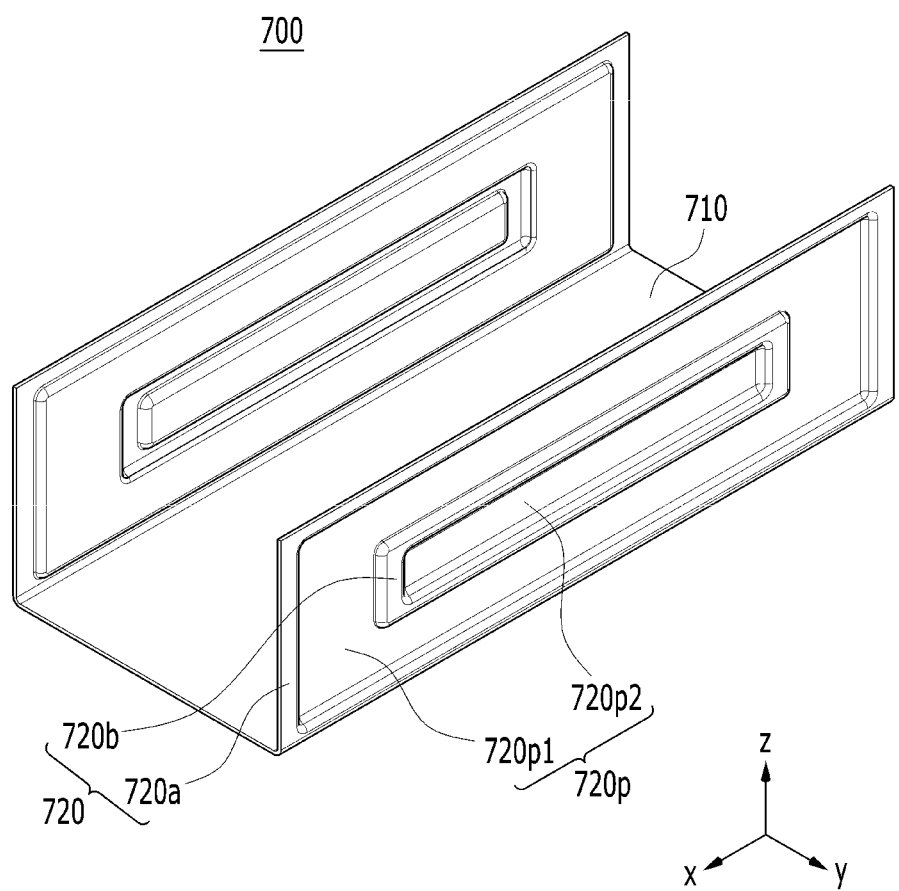

BATTERY MODULE AND METHOD OF MANUFACTURING THE SAME

TECHNICAL FIELD

Cross Citation with Related Application(s)

This application claims the benefit of Korean Patent Application No. 10-2020-0107737 filed on Aug. 26, 2020 and Korean Patent Application No. 10-2021-0102180 filed on Aug. 3, 2021 with the Korean Intellectual Property Office, the disclosures of which are incorporated herein by reference in their entirety.

The present disclosure relates to a battery module and a method of manufacturing the same, and more particularly, to a battery module having improved processability, and a method of manufacturing the same.

BACKGROUND

Secondary battery, which is easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Therefore, a prismatic battery, a pouch-type battery or the like, which can be stacked with high integration and has a small weight relative to capacity, is usually used as a battery cell of the middle or large-sized battery module. Meanwhile, in order to protect the battery cell stack from external impact, heat or vibration, the battery module may include a module frame of which a front surface and a rear surface are opened so as to house the battery cell stack in an internal space.

FIG. 1 is a perspective view illustrating a battery module having a mono frame according to the related art.

Referring to FIG. 1, a battery module may include a battery cell stack 12 formed by stacking a plurality of battery cells 11, a mono frame 20 of which a front surface and a rear surface are opened so as to cover the battery cell stack 12, and end plates 60 that cover the front surface and rear surface of the mono frame 20. In order to form such a battery module, it is necessary to horizontally assemble the battery module such that the battery cell stack 12 is inserted into the opened front surface or rear surface of the mono frame 20 along the X-axis direction as shown by the arrow in FIG. 1. However, in order to stably perform such a horizontal assembly, a sufficient clearance must be secured between the battery cell stack 12 and the mono frame 20. Here, the clearance refers to a gap generated by press-fitting and the like. When the clearance is small, it may lead to a damage of components in the process of the horizontal assembly. Therefore, a height of the mono frame 20 should be designed to be larger in consideration of a maximum height of the battery cell stack 12 and an assembly tolerance in the inserting process, which may cause generation of unnecessary wasted space. A guide film may be used in order to minimize such assembly tolerance, but there is a problem that the guide film is broken during the insertion process or the cost associated with replacement increases.

DETAILED DESCRIPTION OF THE INVENTION

Technical Problem

It is an object of the present disclosure to provide a battery module that improves the inserting speed of the battery cell stack into the frame member and enhances the rigidity, and a method of manufacturing the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a frame member for housing the battery cell stack and having an opened upper part, and an upper plate for covering the battery cell stack on an upper part of the frame member, wherein the frame member comprises two side surface parts facing each other and a bottom part connecting the two side surface parts, and wherein a at least one projected part projected inward is formed in the two side surface parts.

Each of the side surface parts includes a first region in which the at least one projected part is located, and a second area that surrounds the first region, and the second region may be located along at least one side edge of the side surface part.

Thicknesses of the side surface part in the first region and the second region may be equal to each other.

An inclined part may be formed in the at least one projected part adjacent to an upper end of the two side surface parts.

The lower end of the at least one projected part may be spaced above from the bottom part.

The upper end of the at least one projected part may be formed so as to coincide with an upper end of the two side surface parts.

The at least one projected part is a plurality of projected parts, the plurality of projected parts are formed so as to be spaced apart from each other in a longitudinal direction of the battery cell stack, and the plurality of projected parts extend long in a height direction of the battery cell stack.

The at least one projected part is a plurality of projected parts, the plurality of projected parts are formed so as to be spaced apart from each other along a height direction of the battery cell stack, and the plurality of projected parts extend long in a longitudinal direction of the battery cell stack.

The at least one projected part includes a first projected part and a second projected part, and an area of the second projected part may be smaller than an area of the first projected part.

The side surface part may include a first section surrounding the first projected part, and a second section located between the first projected part and the second projected part.

The bottom part and the two side surface parts included in the frame member may be integrally formed.

According to another embodiment of the present disclosure, there is provided a method of manufacturing a battery module, comprising the steps of: inserting a battery cell stack into a frame member with an opened upper part, and forming an upper frame on the battery cell stack so as to cover the opened upper part of the frame member, wherein the frame member comprises a bottom part and two side surface parts facing each other, an inclined part is formed in a projected part adjacent to an upper end of the two side surface parts, and the step of inserting the battery cell stack into the frame member comprises inserting the battery cell stack along the projected part formed in the two side surface parts, and the battery cell stack is inserted while the battery cell stack first contacts the inclined part.

In the step of inserting the battery cell stack into the frame member, the battery cell stack may enter through the opened upper part of the frame member under a condition where a width of the battery cell stack is equal to or greater than an inner distance between the two side surface parts facing each other and equal to or less than an outer distance between the side surface parts facing each other.

The projected part may be formed by press molding.

Advantageous Effects

According to embodiments of the present disclosure, the battery cell stack can be stacked in the vertical direction, thereby improving the inserting speed, eliminating the existing guide film and reducing costs.

In addition, the inner part of the frame member is press-molded, whereby the battery cell stack can be naturally inserted into the frame member without forcibly expanding the left and right upper ends of the frame member.

Further, the press-molding structure can prevent the performance of the battery cell from deteriorating due to the swelling phenomenon.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view illustrating a battery module having a mono frame according to the related art;

FIG. 2 is an exploded perspective view illustrating a battery module according to an embodiment of the present disclosure;

FIG. 3 is a view illustrating a method of manufacturing the battery module according to a comparative example of the present disclosure;

FIG. 4 is a view illustrating a frame member included in the battery module and a method of manufacturing the battery module according to an embodiment of the present disclosure;

FIG. 5 is a perspective view illustrating a frame member included in the battery module of FIG. 4;

FIGS. 6 and 7 are views illustrating modified examples of the frame member of FIG. 4;

FIG. 8 is a perspective view illustrating a battery module including a frame member according to another embodiment of the present disclosure;

FIG. 9 is a perspective view illustrating a battery module including a frame member according to another embodiment of the present disclosure;

FIG. 10 is a view of the frame member of FIG. 9 as viewed from the front;

FIG. 11 is a view showing a modified example of the frame member of FIG. 10;

FIG. 12 is a perspective view illustrating a battery module including a frame member according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 2 is an exploded perspective view illustrating a battery module according to an embodiment of the present disclosure.

Referring to FIG. 2, a battery module 100 according to an embodiment of the present disclosure includes a battery cell stack 200 formed by stacking a plurality of battery cells 110, a module member 300 for housing the battery cell stack 200, end plates 600 located on the front surface and rear surface of the battery cell stack 200, respectively, and a busbar frame 130 positioned between the battery cell stack 200 and the end plate 600. Further, the battery module 100 may include a compression pad 750 arranged on both side surfaces of the battery cell stack 200 and arranged in parallel with the battery cell 110.

The battery cell 110 is a secondary battery and can be configured into a pouch-type secondary battery. The battery cells 110 can be configured by a plurality of numbers, and the plurality of battery cells can be stacked so as to be electrically connected to each other, thereby forming a battery cell stack 200. Although not specifically illustrated, the plurality of battery cells 110 may include an electrode assembly, a battery case, and an electrode lead protruding from the electrode assembly, respectively. On the other hand, as shown in FIG. 2, the plurality of battery cells 110 may be arranged in parallel with both side surfaces 420 of the frame member 400 and may be sequentially stacked along the y-axis direction.

The battery cell stack 200 is housed in a module frame 300 with a rigidity in order to protect from external impacts and the like.

At this time, the module frame 300 may include a frame member 400 for housing the battery cell stack 200 and having an opened upper part (z-axis direction), and an upper frame 450 for covering the opened upper part of the frame member 400. The frame member 400 may include a bottom part 410, and side surface parts 420 each extending upward from both ends of the bottom part 410. The frame member 400 may be U-shaped.

That is, the lower part and both side surface parts of the battery cell stack 200 are wrapped by the frame member 400, and an upper part of the battery cell stack 200 may be covered by an upper frame 450.

The battery cell stack 200 can be mounted inside the module frame 300 by a method of locating the battery cell stack 200 on the bottom part 410 of the frame member 400, and then covering the upper surface of the battery cell stack 200 via the upper frame 450.

In this case, the frame member 400 and the upper frame 450 may be joined by welding, but the joining method is not limited thereto and can be realized by various embodiments.

The end plate 600 may be coupled respectively to the opened front and rear surfaces (x-axis direction and direction opposite thereto) of the frame member 400 and the upper frame 450 that are coupled to each other.

The end plate 600 can protect various electrical components including the battery cell stack 200 from external impact, and at the same time, can guide the electrical connection between the battery cells 110 of the battery cell stack 200 and an external power source.

On the other hand, the battery cell 110 may be a lithium secondary battery or a pouch-type secondary battery. Since the pouch-type secondary battery is generally provided in a form in which an electrode assembly is built in a laminated sheet, it has an advantage of high energy density relative to its small size and weight, but has a disadvantage of weak mechanical rigidity. In particular, in the case of a lithium secondary battery, an electrode may become thicker in the process of repeated charging and discharging, or an internal electrolyte may be decomposed by a side reaction to generate gas. At this time, a phenomenon in which the pouch-type secondary battery cells swell up due to the electrode expansion or the generated gas is called a 'swelling phenomenon'.

In the present embodiment, compression pads 750 may be arranged on both side surfaces of the battery cell stack 200, respectively. The battery cells 110 can be strongly pressed from the initial stage through the compression pad 750, thereby relatively reducing the thickness expansion due to swelling, preventing the performance of the battery cells 110 from deteriorating due to the swelling phenomenon, and reducing the change in the external shape of the battery module 100.

The compression pads 750 can include polyurethane foam so as to suppress the swelling phenomenon.

On the other hand, when the compression pads 750 are arranged respectively on both side surfaces of the battery cell stack 200, a double-sided tape is provided between the battery cell stack 200 and the compression pad 750, so that the compression pads 750 can be primarily fixed to the battery cell stack 200.

Further, the compression pad 750 can be fixed by using an adhesive injected instead of the double-sided tape. Specifically, the adhesive is jetted on both side surfaces of the battery cell stack 200, respectively, and then a compression pad 750 can be attached thereon. The adhesive can be jetted from a nozzle by a pressure pump in a high temperature molten form.

On the other hand, the battery cell stack 200 may be located on the bottom part 410 of the frame member 400 via the opened upper surface (z-axis direction) of the frame member 400. At this time, a defect may occur in which the compression pad 750 is rolled up by the side surface part 420. Such a defect has a large adverse effect on the automated process for manufacturing the battery module 100. In order to prevent such a defect, the inserting process of the battery cell stack can be performed by using a device such as an expanding jig.

The battery module 100 according to the present embodiment may further include a thermal conductive resin layer 411 located on the lower surface of the battery cell stack 200. Further, when one or more battery modules 100 constitute a battery pack, a heat sink may be located at a lower end of the battery module 100.

The thermal conductive resin layer 411 may include a thermal conductive resin, in particular, a thermal conductive adhesive material. For example, it may include at least one of a silicone-based material, a urethane-based material, and an acrylic-based material, and it is particularly preferable to include a urethane-based material.

The thermal conductive resin is a material having excellent thermal conductivity, and the heat generated in the battery cells may be discharged to the outside through the thermal conductive resin layer 411 and the heat sink. However, the thermal conductive resin includes a thermal conductive adhesive material, and is a liquid when coating, but may be cured after the battery cell stack 200 is stacked thereon. Therefore, the thermal conductive resin layer 411 may fix the battery cell stack 200 in the battery module 100. That is, the thermal conductive resin layer 411 in the present embodiment not only improves heat dissipation characteristics for the battery cell stack 200, but also has an effect of effectively fixing the battery cell stack 200.

FIG. 3 is a view illustrating a method of manufacturing the battery module according to a comparative example of the present disclosure.

Referring to FIG. 3, in the method of manufacturing a battery module according to the comparative example, both side surface parts of the frame member 30 can be forcibly expanded using an expanding jig 35, before mounting the battery cell stack 70 to the bottom part of the frame member 30. The battery cell stack 70 can be inserted into the bottom part of the frame member 30 in a state where both side surface parts of the frame member 30 are forcibly expanded by the expanding jig 35. However, if the expansion amount becomes large according to the width and height of the frame member 30, there is a problem that permanent deformation occurs outside the elastic limit.

Therefore, the battery module 100 according to the present embodiment allows the battery cell stack to be naturally inserted into the frame member without forcibly expanding the frame member, whereby an attempt is made to eliminate the above-mentioned defects in the manufacturing process, which will be described later.

FIG. 4 is a view illustrating a frame member included in the battery module and a method of manufacturing the battery module according to an embodiment of the present disclosure. FIG. 5 is a perspective view illustrating a frame member included in the battery module of FIG. 4.

Referring to FIGS. 4 and 5, the frame member 400 included in the battery module according to the present embodiment includes a bottom part 410 and side surface portions 420 each extending upward from both ends of the bottom part 410. At this time, the bottom part 410 and the two side surface parts 420 can be integrally formed.

A projected part 420p is formed by press molding in the side surface part 420 of the frame member 400. The side surface part 420 may include a first region P1 in which the projected part 420p is located, and a second region P2 that surrounds the first region P1. According to the present embodiment, the thickness of the first region P1 of the side surface part 420 in which the projected part 420p is formed and the thickness of the second region P2 of the side surface part 420 in which the projected part 420p is not formed may be equal to each other.

The second region P2 may be located along at least one side edge of the side surface part 420. For example, as shown in FIG. 5, the projected part 420p can be formed, excluding the upper end and both side ends of the side surface part 420. An inclined portion 420ps can be formed in a portion of the projected part 420p adjacent to the upper end of the side surface part 420. In this manner, the press-molded projected part 420p and the inclined part 420ps according to the present embodiment perform the role of allowing the battery cell stack 200 to be naturally inserted in the process of inserting the battery cell stack 200 into the frame member 400. At this time, the battery cell stack 200 can enter through the opened upper part of the frame member 400 under a condition where its width is equal to or greater than the inner distance d1 between the side surface parts 420 of the frame member 400 facing each other and equal to or less than the outer distance d2 between the side surface parts 420 of the frame member 400 facing each other. The width of the battery cell stack 200 may mean a length in the y-axis direction, which is the direction in which the battery cells 110 are stacked, as shown in FIG. 2.

The side surface part 420 according to the present embodiment may be formed of a metal material, and as an example, may be formed of steel or an aluminum alloy. The side surface part 420 can have a level of rigidity that allows the battery cell stack 200 to ride over the side surface part 420 of the frame member 400 as if it slides.

A method of manufacturing the battery module described above will be described.

Referring to FIGS. 2, 4 and 5, a method of manufacturing a battery module according to an embodiment of the present disclosure includes a step of inserting a battery cell stack 200 into the frame member 400 with an opened upper part. At this time, the battery cell stack 200 is inserted along the projected part 420p formed in the side surface part 420, and the battery cell stack 200 is inserted while the battery cell stack 200 first contacts the inclined portion 420ps formed in the projected portion 420p adjacent to the upper end of the side surface part 420.

Subsequently, an upper frame 450 is formed on the battery cell stack 200 so as to cover the opened upper part of the frame member 400, and the upper frame 450 can be coupled to the frame member 400 by welding or the like. Then, the end plates 600 can be respectively coupled to the opened front and rear surfaces (x-axis direction and direction opposite thereto) of the frame member 400 and the upper frame 450 coupled to each other.

As described above, according to the battery module and the manufacturing method thereof according to the present embodiment, it is possible to assemble within the elastic limit of the frame member material regardless of the width and height of the frame member, and the process of expanding the frame member can be omitted, and thus the process time can be shortened.

FIGS. 6 and 7 are views illustrating a modified example of the frame member of FIG. 4.

Referring to FIG. 6, the lower end of the projected part 420p' formed in the side surface part 420 may be spaced apart from the bottom part 410, unlike that shown in FIGS. 4 and 5. In the present embodiment, the lower end of the projected part 420p' is obliquely shown in FIG. 6, but unlike the upper end of the projected part 420p', the lower end may be perpendicular to the side surface part 420 without being inclined.

Referring to FIG. 7, the upper end of the projected part 420p'' formed in the side surface part 420 may be formed so as to substantially coincide with the upper end of the side surface part 420, unlike that shown in FIGS. 4 and 5.

FIG. 8 is a perspective view illustrating a battery module including a frame member according to another embodiment of the present disclosure.

Referring to FIG. 8, the frame member 500 according to the present embodiment includes a bottom part 510, and side surface parts 520 each extending upward from both ends of the bottom part 510. At this time, the bottom part 510 and the two side surface parts 520 can be integrally formed. One projected part 420p is formed in the frame member 400 shown in FIG. 5, but a plurality of projected parts 520p are formed by press molding in the side surface part 520 of the frame member 500 according to the present embodiment. The plurality of projected parts 520p can be formed so as to be spaced apart from each other along the x-axis direction, which is the longitudinal direction of the battery cell 110 shown in FIG. 2. Each of the projected parts 520p extends long in the z-axis direction, which is the height direction of the battery cell 110.

According to the present embodiment, the plurality of projected parts 520p can be formed by press molding, thereby improving the structural rigidity.

The frame member 500 of FIG. 8 is a modified example of the frame member 400 described with reference to FIG. 5, and in addition to the differences described above, all of the contents described with reference to FIG. 5 can be applied to the present embodiment.

FIG. 9 is a perspective view illustrating a battery module including a frame member according to another embodiment of the present disclosure. FIG. 10 is a view of the frame member of FIG. 9 as viewed from the front.

Referring to FIGS. 9 and 10, the frame member 600 according to the present embodiment includes a bottom part 610, and side surface parts 620 each extending upward from both ends of the bottom part 610. At this time, the bottom part 610 and the two side surface parts 620 can be integrally formed. One projected part 420p is formed in the frame member 400 shown in FIG. 5, but a plurality of projected parts 620p are formed by press molding in the side surface part 620 of the frame member 600 according to the present embodiment. In the frame member 500 shown in FIG. 8, the plurality of projected parts 520p are formed so as to be spaced apart from each other along the length direction of the battery cell, but the projected parts 620p according to the present embodiment can be formed by a plurality of numbers so as to be spaced apart from each other along the z-axis direction, which is the height direction of the battery cell 110 shown in FIG. 2. Each of the projected parts 620p extends long in the x-axis direction, which is the longitudinal direction of the battery cell 110.

The frame member 600 of FIG. 9 is a modified example of the frame members 400 and 500 described in FIGS. 5 and 8, and in addition to the differences described above, all of the contents described with reference to FIGS. 5 and 8 can be applied to the present embodiment.

FIG. 11 is a view showing a modified example of the frame member of FIG. 10.

Referring to FIG. 11, among the plurality of projected parts 620p' formed in the side surface part 620, the lower end of the projected part 620p' located under the side surface part 620 can be spaced apart from the bottom part 610, unlike the one shown in FIG. 10. The lower end of the projected part 620p' in the present embodiment is obliquely shown in FIG. 11, but unlike the upper end of the projected part 620p', the lower end may be perpendicular to the side portion 620 without being inclined.

FIG. 12 is a perspective view illustrating a battery module including a frame member according to another embodiment of the present disclosure.

Referring to FIG. 12, the frame member 700 according to the present embodiment includes a bottom part 710, and side surface part 720 each extending upward from both ends of the bottom part 710. At this time, the bottom part 710 and the two side surface parts 720 can be integrally formed. One projected part 420p is formed in the frame member 400 shown in FIG. 5, but a plurality of projected parts 720p are formed by press molding in the side surface part 720 of the frame member 700 according to the present embodiment. Particularly, the projected part 720p according to the present embodiment includes a first projected part 720p1 and a second projected part 720p2, and an area of the second projected part 720p2 is smaller than an area of the first projected part 720p1. The first projected part 720p1 is formed along the edge of the side surface part 720, and the second projected part $720p^2$ can be formed in the center of the side surface part 720 which is not press-formed.

The side surface part 720 according to the present embodiment may include a first side surface part 720a surrounding the first projected part 720p1 and a second side surface part 720b located between the first projected part 720p1 and the second projected part 720p2.

The frame member 700 of FIG. 12 is a modified example of the frame members 400 and 500 described in FIGS. 5 and 8, and in addition to the differences described above, all of the contents described with reference to FIGS. 5 and 8 can be applied to the present embodiment.

On the other hand, one or more of the battery modules according to the present embodiments can be packaged in a pack case to form a battery pack.

The above-mentioned battery module and battery pack can be applied to various devices. Such a device can be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other modifications and improvements made by those skilled in the art using the basic principles of the invention described in the appended claims will fall within the spirit and scope of the present disclosure.

DESCRIPTION OF REFERENCE NUMERALS

110: battery cell
200: battery cell stack
300: module frame
400, 500, 600, 700: frame member
420, 520, 620, 720: side surface part
420p, 520p, 620p, 720p: projected part
420ps: inclined part

The invention claimed is:

1. A battery module comprising:
a battery cell stack in which a plurality of battery cells are stacked,
a frame member for housing the battery cell stack and having an opened upper part, and
an upper plate for covering the battery cell stack on the upper part of the frame member,
wherein the frame member comprises two side surface parts facing each other and a bottom part connecting the two side surface parts,
wherein an inner surface of each of the two side surface parts forms an internal space for the battery cell stack,
wherein at least one projected part projecting into the internal space is formed in the two side surface parts, the at least one projecting part having a vertical surface and an inclined part, and
wherein a bottom edge of the inclined part and the vertical surface of the at least one projecting part form an edge.

2. The battery module according to claim 1, wherein each of the two side surface parts comprises a first region in which the at least one projected part is located, and a second region that surrounds the first region, and
wherein the second region is located along at least one side edge of the side surface part.

3. The battery module according to claim 2, wherein thicknesses of the two side surface parts in the first region and the second region are equal to each other.

4. The battery module according to claim 1, wherein a lower end of the at least one projected part is spaced above from the bottom part.

5. The battery module according to claim 1, wherein an upper end of the at least one projected part is formed so as to coincide with an upper end of the two side surface parts.

6. The battery module according to claim 1, wherein the at least one projected part is a plurality of projected parts, wherein the plurality of projected parts are formed so as to be spaced apart from each other in a longitudinal direction of the battery cell stack and
wherein the plurality of projected parts extend in a height direction of the battery cell stack.

7. The battery module according to claim 1, wherein the at least one projected part is a plurality of projected parts, wherein the plurality of projected parts are formed so as to be spaced apart from each other along a height direction of the battery cell stack, and
wherein the plurality of projected parts extend in a longitudinal direction of the battery cell stack.

8. The battery module according to claim 1, wherein the at least one projected part comprises a first projected part and a second projected part, and an area of the second projected part is smaller than an area of the first projected part.

9. The battery module according to claim 8, wherein the side surface part comprises a first section surrounding the first projected part, and a second section located between the first projected part and the second projected part.

10. The battery module according to claim 1, wherein the bottom part and the two side surface parts included in the frame member are integrally formed.

11. A method of manufacturing a battery module, comprising the steps of:
- inserting a battery cell stack into a frame member with an opened upper part, and
- forming an upper frame on the battery cell stack so as to cover the opened upper part of the frame member,
- wherein the frame member comprises a bottom part and two side surface parts facing each other, an inclined part is formed in a projected part adjacent to an upper end of the two side surface parts,
- wherein an inner surface of each of the two side surface parts is vertical and forms an internal space for the battery cell stack, and
- wherein the step of inserting the battery cell stack into the frame member comprises inserting the battery cell stack along the projected part formed in the two side surface parts, and the battery cell stack is inserted in the internal space while the battery cell stack first contacts the inclined part, and
- wherein a bottom edge of the inclined part and the vertical inner surface of the each of the two side surface parts form an edge.

12. The method of manufacturing a battery module according to claim 11, wherein in the step of inserting the battery cell stack into the frame member, the battery cell stack enters through the opened upper part of the frame member under a condition where a width of the battery cell stack is equal to or greater than an inner distance between the two side surface parts facing each other and equal to or less than an outer distance between the side surface parts facing each other.

13. The method of manufacturing a battery module according to claim 11, wherein the projected part is formed by press molding.

14. The battery module according to claim 1, wherein the at least one projected part comprises a first projected part in a first side surface part of the two side surface parts and a second projected part in a second side surface part of the two side surface parts.

15. The battery module according to claim 14, wherein a width of the battery cell stack is greater than a width between the first projected part and the second projected part.

16. The battery module according to claim 1, wherein a width of the at least one projected part projecting is less than a width of the two side surface parts.

17. The battery module according to claim 16, wherein a height of the at least one projected part projecting is less than a height of the two side surface parts.

* * * * *